United States Patent
Huang (10) Patent No.: US 9,346,066 B2
(45) Date of Patent: May 24, 2016

(54) NON-WOVEN POLYMER FIBER MAT FOR USE IN A LITHIUM ION BATTERY ELECTROCHEMICAL CELL

(75) Inventor: Xiaosong Huang, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/488,691

(22) Filed: Jun. 5, 2012

(65) Prior Publication Data
US 2013/0319599 A1 Dec. 5, 2013

(51) Int. Cl.
| | |
|---|---|
| H01M 2/16 | (2006.01) |
| B32B 37/24 | (2006.01) |
| B05B 5/025 | (2006.01) |
| D04H 1/413 | (2012.01) |
| D04H 1/728 | (2012.01) |
| D04H 3/03 | (2012.01) |
| D01D 5/00 | (2006.01) |
| H01M 2/14 | (2006.01) |
| H01M 10/052 | (2010.01) |

(52) U.S. Cl.
CPC .............. *B05B 5/025* (2013.01); *D01D 5/0069* (2013.01); *D04H 1/413* (2013.01); *D04H 1/728* (2013.01); *D04H 3/03* (2013.01); *H01M 2/145* (2013.01); *H01M 2/162* (2013.01); *H01M 10/052* (2013.01)

(58) Field of Classification Search
USPC .................................. 427/402–421.1; 264/115
See application file for complete search history.

(56) References Cited

U.S. PATENT DOCUMENTS

| | | | | |
|---|---|---|---|---|
| 3,752,613 | A | * 8/1973 | Vogt et al. | 425/224 |
| 7,387,852 | B2 | * 6/2008 | Lee | 429/306 |
| 2010/0233523 | A1 | * 9/2010 | Jo et al. | 429/144 |

FOREIGN PATENT DOCUMENTS

KR 10-2001-0091023 * 10/2001 ............ D06M 11/00

OTHER PUBLICATIONS

A. Jaworek, Electrospinning and Electrospraying Techniques for Nanocomposite Non-Woven Fabric Production, Fibers & Textiles in Eastern Europe 2009, vol. 17, No. 4 (75) pp. 77-81.*
U.S. Appl. No. 13/407,893, filed Feb. 29, 2012; Title: "Electrode-Separator Integral Segment for a Lithium Ion Battery".
U.S. Appl. No. 13/562,432; filed Jul. 31, 2012; Title: "Composite Separator for Use in a Lithium Ion Battery Electrochemical Cell".

* cited by examiner

*Primary Examiner* — Ula C Ruddock
*Assistant Examiner* — Osei Amponsah
(74) *Attorney, Agent, or Firm* — Reising Ethington P.C.

(57) ABSTRACT

A method of making a non-woven polymer fiber mat that includes one or more polymer fibers and particles intermingled with the one or more polymer fibers is disclosed. The method, more specifically, includes simultaneously electrospinning the one or more polymer fibers and spraying the particles onto a collection face of a collector substrate. Once formed, the non-woven polymer fiber mat may be incorporated into an electrochemical battery cell of a lithium ion battery.

20 Claims, 4 Drawing Sheets

NON-WOVEN POLYMER FIBER MAT FOR USE IN A LITHIUM ION BATTERY ELECTROCHEMICAL CELL

TECHNICAL FIELD

The technical field of this disclosure relates generally to a secondary lithium ion battery and, more specifically, to a non-woven polymer fiber mat that may be used as all or part of a separator which is disposed between a negative electrode and a positive electrode in an electrochemical battery cell of a lithium ion battery.

BACKGROUND

A secondary lithium ion battery generally contains at least one electrochemical battery cell that includes a negative electrode, a positive electrode, and a separator situated between the electrodes. The separator facilitates operation of the electrochemical battery cell by providing a porous and electrically-insulative physical support barrier between confronting faces of the two electrodes as is generally well understood in the art. To operate as intended, the separator is typically designed to have a porosity sufficient to contain a liquid electrolyte that can communicate lithium ions, yet remain thermally, chemically, and mechanically stable enough to separate the confronting faces of the negative and positive electrodes over the course of many discharge/charge cell cycles so that a short-circuit is prevented. The most commonly used separators today are made from a single extruded polyolefin sheet membrane or a laminate of several extruded polyolefin sheet membranes. Uniaxial or biaxial stretching is often relied upon during manufacture of the polyolefin sheet membrane(s) to promote the requisite porosity.

A conventional polyolefin sheet membrane, however, is potentially susceptible to certain performance declines when heated excessively. Exposure of the electrochemical battery cell to temperatures of 80° C. and above can cause the polyolefin sheet membrane to shrink, soften, and even melt. Such high temperatures can be attributed to charging-phase heat generation, ambient atmospheric temperature, or some other source. The physical distortion of a polyolefin sheet membrane may ultimately permit the electrochemical battery cell to short-circuit through direct electrical contact between the confronting faces of the negative and positive electrodes. Battery thermal runaway is also a possibility if the electrodes come into direct electrical contact with one another to an appreciable extent. The tendency of an extruded and stretched polyolefin sheet membrane to lose some thermal stability at temperatures exceeding 80° C. for prolonged periods is a potential concern for some lithium ion battery applications.

A separator fabricated at least in part from a sheet membrane constructed from one of several types of engineering polymers that exhibit better thermal stability than a polyolefin could potentially enhance the temperature operating window of an electrochemical battery cell and, consequently, the lithium ion battery. But the techniques often used to make a polyolefin sheet membrane generally cannot transform the various types of engineering polymers into a sheet membrane that exhibits sufficient porosity across its thickness at reasonable costs. The stretching techniques used to make a polyolefin sheet membrane have also been shown to adversely affect the dimensional stability of a sheet membrane formed from certain engineering polymer materials when exposed to elevated temperatures above 80° C. and, more noticeably, above 100° C. For example, when heated to such temperatures, a sheet membrane constructed from an engineering polymer may shrink in the direction that it was previously stretched.

A fabrication method that can reliably incorporate a robust array of polymer materials—both commodity polymers and engineering polymers—into a separator that is thermally stable and sufficiently porous within the construct of an electrochemical battery cell for a lithium ion battery is therefore needed.

SUMMARY OF THE DISCLOSURE

A method of making a non-woven polymer fiber mat—which comprises one or more polymer fibers and particles intermingled with the one or more polymer fibers—is disclosed. The non-woven polymer fiber mat may be employed as all or part of a separator for an electrochemical battery cell of a lithium ion battery; that is, the non-woven polymer fiber mat may be situated, by itself, between a negative electrode and a positive electrode of the electrochemical battery cell or, alternatively, the mat may be combined with at least one other material layer. The disclosed method of making the non-woven polymer fiber mat includes simultaneously electrospinning the one or more polymer fibers and spraying the particles onto a collection face of a collector substrate. The simultaneous use of electrospinning and spraying operations helps provide the non-woven polymer fiber mat with desirable physical and mechanical properties. As used herein, the term "spraying" broadly encompasses any known procedure capable of providing the particles including, for example, electrospraying and compressed air spraying. Only electrospraying is described below in the detailed description, however, since electrospraying constitutes the preferred spraying operation.

DETAILED DESCRIPTION

Figure 1:
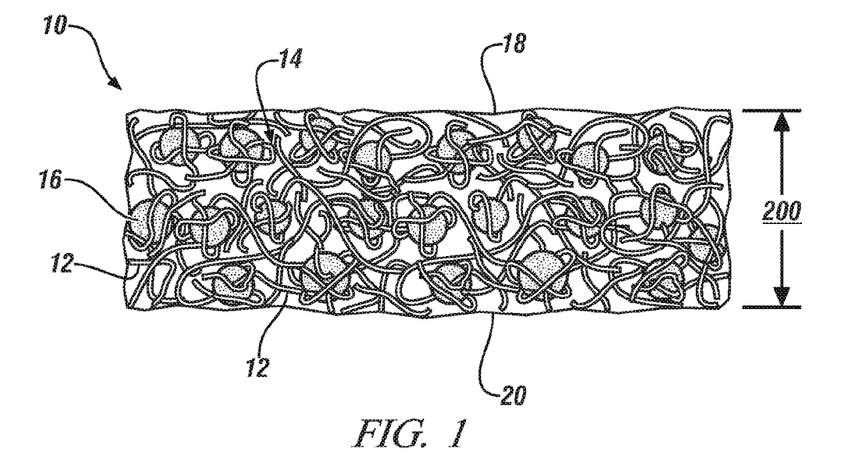
FIG. 1 is a generalized and schematic cross-sectional illustration of a non-woven polymer fiber mat that may be used as all or part of a separator for an electrochemical battery cell of a lithium ion battery. The non-woven polymer fiber mat includes one or more polymer fibers and particles intermingled with the polymer fiber(s).

A non-woven polymer fiber mat 10 that may be used as all or part of a separator for an electrochemical battery cell of a lithium ion battery is shown generally in FIG. 1. That is, the non-woven polymer fiber mat 10 may be situated by itself between opposed confronting faces of a negative electrode and a positive electrode of the electrochemical battery cell or, alternatively, the non-woven polymer fiber mat 10 may be combined with other material layers into a laminated composite separator that is situated between the electrodes. These other material layers may include, for example, another similarly constructed non-woven polymer fiber mat formed of the same or different materials, a conventional polyolefin sheet membrane layer, a ceramic particle layer, or any other appropriate material layer that a skilled artisan would like to combine with the non-woven polymer fiber mat 10 to achieve a desired performance effect. The non-woven polymer fiber mat 10 is preferably fabricated by a method that involves conducting simultaneous electrospinning and electrospraying operations as depicted generally in FIGS. 2-4.

Still referring to FIG. 1, the non-woven polymer fiber mat 10 includes one or more polymer fibers 12 (sometimes referred to as "polymer fiber(s)" for brevity) assembled into a fibrous web 14 of preferably random arrangement. The non-woven polymer fiber mat 10 also includes particles 16 intermingled with the polymer fiber(s) 12 and dispersed throughout the fibrous web 14. The bulk structure of the fibrous web 14 and the dispersed particles 16 extends between a first major face 18 and an oppositely-oriented second major face 20 of the non-woven polymer fiber mat 10. These major faces 18, 20 define a thickness 200 of the mat 10 that is preferably somewhere in the range of about 5 µm to about 50 µm, more preferably somewhere in the range of about 10 µm to about 35 µm, and most preferably somewhere in the range of about 15 µm to about 25 µm. The first and second major faces 18, 20 are significantly larger in surface area than any of the edge surfaces of the mat 10 that extend between the first and second major faces 18, 20 in the thickness direction. This is because the first and second major faces 18, 20 are intended to be oriented towards the spaced-apart confronting surfaces of a negative electrode and a positive electrode within the construct of an electrochemical battery cell of a lithium ion battery.

The one or more polymer fibers 12 are nanometer- to micrometer-sized in diameter and are made by electrospinning. A preferred diameter of the polymer fiber(s) 12 is about 10 nm to about 10 µm, more preferably about 50 nm to about 2 µm, and most preferably about 50 nm to about 1 µm. Having such a small-diameter provides the polymer fiber(s) 12 with sufficient flexibility and strength, a high surface area to mass ratio, and an ability to define a tortuous porous structure within the fibrous web 14. The ability to define a tortuous porous structure can, in turn, when the non-woven polymer fiber mat 10 is incorporated into an electrochemical battery cell as all or part of a separator, help entangle the particles 16 and keep them from gravitationally settling or sifting out of the fibrous web 14, help prevent lithium dendrites from growing unhindered at the negative electrode and reaching the positive electrode, and help distribute a soaked liquid electrolyte throughout the non-woven polymer fiber mat 10 so that lithium ions can be passed between the electrodes coextensively through the mat 10.

The polymer fiber(s) 12 that constitute the fibrous web 14 are preferably comprised of a polymer material suitable for use in an electrochemical battery cell of a lithium ion battery and, additionally, one that is conducive to electrospinning. Some exemplary polymer materials that may be employed include a polyolefin (PO), a polyamic acid (PAA), a polyimide (PI), a polyamide (PA), a polysulfone (PS), a polyester (PE), a fluoropolymer (FP), a polyacrylate (PAC), an acrylic (AC), a polycarbonate (PC), a polyurethane (PU), and mixtures thereof. Specific and exemplary polymer materials encompassed by these polymer material families include polypropylene (PP), polyethylene (PE), polyetherimide (PEI), polyhexamethylene adipamide (nylon 6,6), polycaprolactam (nylon 6), an aromatic polyamide such as polyparaphenylene terephthalamide (i.e., Kevlar®), standard polysulfone (PSO (reaction product of 2,2-bis(4-hydroxyl) propane and 4,4'-dichlorodiphenyl sulfone), polyarylsulfone (PAS), polyethersulfone (PES), polyphenylsulfone (PPSF), a thermoplastic polyester such as polyethylene terephthalate (PET), a liquid crystal polymer such as the polycondensation product of 4-hydroxybenzoic acid and 6-hydroxynaphthalene-2-carboxylic acid (i.e., Vectran®), polyvinylidene fluoride (PVdF), poly(methyl methacrylate) (PMMA), polyacrylonitrile (PAN), poly(bisphenol A-carbonate), and polyether- and polyester-based polyurethanes. PET, PAN, PEI, an aromatic polyamide such as Kevlar®, a liquid crystal polymer such as Vectran®, and PVdF are the most preferred polymer materials for making the polymer fiber(s) 12.

The particles 16 are also nanometer- to micrometer-sized in diameter and are preferably made by electrospraying. A preferred diameter of the particles 16 is about 50 nm to 5 µm, more preferably about 80 nm to about 3 µm, and most preferably about 100 nm to about 1 µm. The intermingling of these sized particles 16 with the polymer fiber(s) 12 throughout the fibrous web 14 can achieve several beneficial effects. For instance, the presence of the particles 16 can further refine the complexity of the tortuous porous structure defined by the polymer fiber(s) 12, structurally reinforce the fibrous web 14, densify the non-woven polymer fiber mat 10, help achieve a more structurally uniform mat 10, and improve the thermal and compressive strength of the mat 10 if the particles 16 have good thermal and mechanical properties. Moreover, depending on the expected use of the non-woven polymer fiber mat 10, the particles 16 may be evenly dispersed throughout the fibrous web 14 of the polymer fiber(s) 12, or they may be concentrated in a specified target area. A higher concentration of particles 16 may be desired in regions of the mat 10 that have a tendency to experience localized temperature increases relative to the rest of the mat 10 during use in an electrochemical battery cell of a lithium ion battery because of, for example, a non-uniform current density distribution caused by the location of electrical connectors.

The particles 16 are preferably comprised of a ceramic material, a polymer material, or both, that is suitable for use in an electrochemical battery cell of a lithium ion battery and conducive to electrospraying. Forming the particles 16 out of a ceramic material is most preferred since ceramics are typically quite heat-resistance, wettable by lithium ion battery liquid electrolytes, and electrochemically stable within the operating environment of an electrochemical battery cell of a lithium ion battery. Some examples of suitable ceramic materials include alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, petalite, and mixtures thereof. Of these various suitable ceramic materials, however, alumina, silica, and ceria are favored because, on balance, they perform adequately and are generally widely available through numerous commercial sources at low relative cost.

The polymer materials that may be employed to make the particles 16 include a cross-linked thermoset polymer and an engineering thermoplastic polymer. Some examples of suitable cross-linked thermoset polymer materials include the cured forms of a polyimide, a polyurethane, a phenol-formaldehyde resin, a melamine-formaldehyde resin, an epoxy resin, and mixtures thereof. Some examples of suitable engineering thermoplastic polymers include those of a polyolefin, a polyimide, a polyamide, a polysulfone, a polyester, a fluoropolymer, a polyacrylate, an acrylic, a polycarbonate, a polyurethane, a polyketone, and mixtures thereof. Specific and exemplary polymer materials encompassed by these polymer material families include polypropylene, polyethylene, polyetherimide, polyhexamethylene adipamide (nylon 6,6), polycaprolactam (nylon 6), an aromatic polyamide such as polyparaphenylene terephthalamide (i.e., Kevlar®), standard polysulfone, polyarylsulfone, polyethersulfone, polyphenylsulfone, a polyester such as polyethylene terephthalate, a liquid crystal polymer such as the polycondensation product of 4-hydroxybenzoic acid and 6-hydroxynaphthalene-2-carboxylic acid (i.e., Vectran®), polyvinylidene fluoride, poly(methyl methacrylate), polyacrylonitrile, poly(bisphenol A-carbonate), polyether- and polyester-based polyurethanes, polyether ketone (PEK), polyether ether ketone (PEEK), polyarylether ketone (PAEK), ethylene-vinyl acetate, and mixtures thereof. Of course other types of polymer materials not specifically listed above may also be used to fabricate the particles 16 as is generally understood by skilled artisans.

The exact relative amounts of the polymer fiber(s) 12 and the particles 16 included in the non-woven polymer fiber mat 10 is largely based on the physical and mechanical properties sought to be imparted to the mat 10 such as, for example, the porosity, density, compressibility, lithium ion conductance, and thermal stability, to name but a few properties of interest. But in general the non-woven polymer fiber mat 10 typically comprises about 20 vol. % to about 80 vol. % of the polymer fiber(s) 12 and about 20 vol. % to about 80 vol. % of the particles 16, each based on the total volume of the polymer fiber(s) 12 and the particles 16. A more specific and preferred amount of the polymer fiber(s) 12 and the particles 16 included in the non-woven polymer fiber mat 10 is about 50 vol. % of each based on their total combined volume; that is, the mat 10 preferably includes a 1:1 volume ratio of the polymer fiber(s) 12 and the particles 16.

In order to accommodate the internal communication of lithium ions, the polymer fiber(s) 12 and the dispersed particles 16 together provide the non-woven polymer fiber mat 10 with a porosity that traverses its thickness 200 and connects the opposed first and second major faces 18, 20. The term "porosity" as used here refers to the volume percentage of the non-woven polymer fiber mat 10 that is occupied by open space (i.e., pores) and is infiltratable by a liquid electrolyte that can communicate lithium ions. These pores may vary in size, shape, and spacing. But collectively they are generally small enough and sufficiently distributed to prevent contact between the confronting surfaces of the negative and positive electrodes the non-woven polymer fiber mat 10 is meant to separate, yet still large enough and adequately interconnected to contain a liquid electrolyte and facilitate lithium ion mobility. One or more of the size, relative volume, and composition of the polymer fiber(s) 12 and the particles 16 are preferably managed so that the non-woven polymer fiber mat 10 exhibits a porosity between about 30% and about 90%—more preferably between about 40% and about 70%. This degree of porosity is also preferably distributed throughout the non-woven polymer fiber mat 10 to allow the communication of lithium ions coextensively between the first and second major faces 18, 20.

Figure 2:
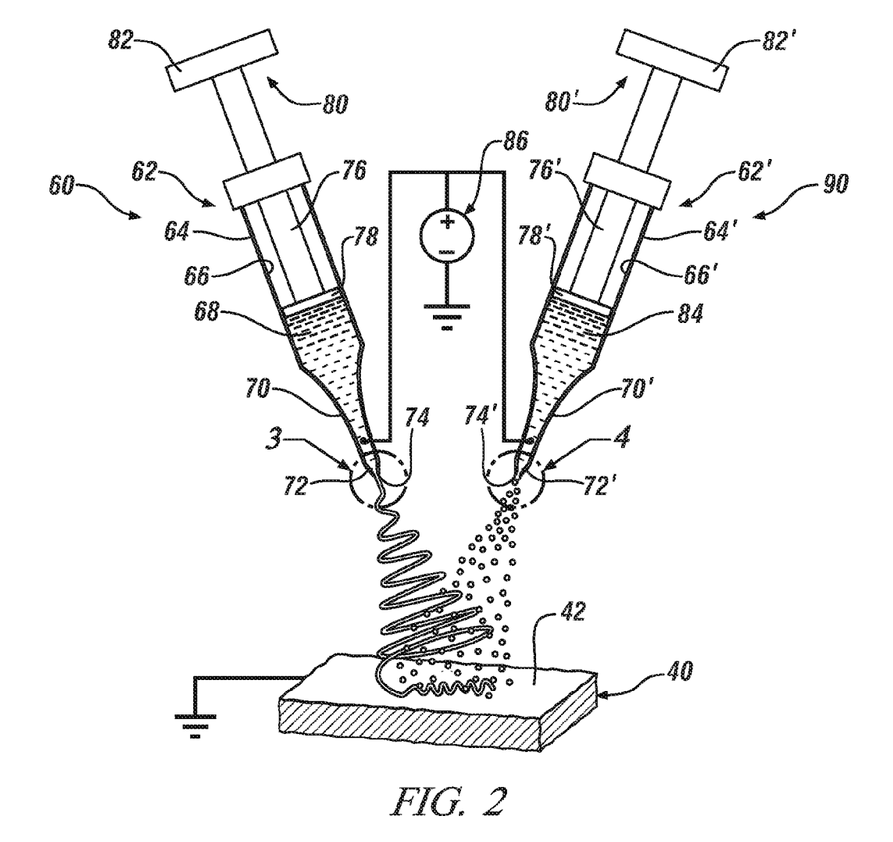
FIG. 2 is a generalized diagrammatic illustration of an electrospinning apparatus and an electrospraying apparatus that, together, may be used to fabricate the non-woven polymer fiber mat depicted in FIG. 1.

The non-woven polymer fiber mat 10 shown in FIG. 1, as well as related variations, can be fabricated by a method that includes electrospinning the polymer fiber(s) 12 and electrospraying the particles 16, simultaneously, onto a collector substrate 40, as depicted generally in FIG. 2. The polymer fiber(s) 12 may be electrospun from an electrospinning apparatus 60 and the particles 16 may be electrosprayed from an electrospraying apparatus 90. Each of the electrospinning apparatus 60 and the electrospraying apparatus 90 is preferably situated so that a collection face 42 of the collector substrate 40 can be positioned into deposition alignment with the two apparatuses 60, 90; that is, the electrospinning apparatus 60 and the electrospraying apparatus 90 are both aimed towards the collection face 42 so that the polymer fiber(s) 12 derived from the electrospinning apparatus 60 and the particles 16 derived from the electrospraying apparatus 90 can be intermingled with one another and deposited onto the collection face 42 of the collector substrate 40 while both apparatuses 60, 90 are operating.

The collector substrate 40 may be any electrically conductive structure known to skilled artisans that is compatible with the electrospinning and electrospraying operations. For instance, the collector substrate 40 may be a generally flat metal layer, such as a thin metal sheet or metal foil, and may be constructed from any of a wide range of metals and alloys including aluminum, stainless steel, and copper, to name but a few examples. The metal layer does not have any particular thickness constraints. Although in many instances the thickness of the metal layer ranges anywhere from about 10 μm and about 1 mm. Such metal layer constructions of the collector substrate 40 permit the non-woven polymer fiber mat 10 to be formed on, and then removed from, the collection face 42 before being incorporated into an electrochemical battery cell of a lithium ion battery. The non-woven polymer fiber mat 10 may be referred to as "free standing" if formed in this manner since the mat 10, once removed from the collector substrate 40, is an autonomously handleable structure.

Figure 5:
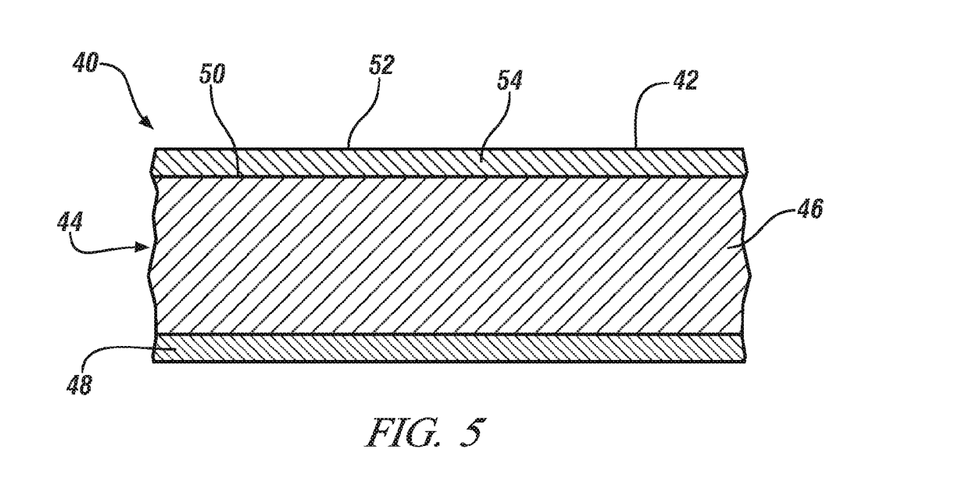
FIG. 5 is a generalized and schematic illustration of one embodiment of a current collector substrate onto which the non-woven polymer fiber mat may be formed by the electrospinning apparatus and the electrospraying apparatus depicted in FIG. 2. The current collector substrate comprises an electrode for an electrochemical battery cell of a lithium ion battery and a metallic current collector.

In another embodiment, as shown in FIG. 5, the collector substrate 40 may be an electrode integral segment 44. The electrode integral segment 44 may include an electrode 46 and a metallic current collector 48 situated underneath—and in direct interfacial contact with—the electrode 46 opposite the collection face 42. An exposed face 50 of the electrode 46 or, alternatively, an exposed face 52 of an optional ceramic particle layer 54 overlying the electrode 46, as shown here, may constitute the collection face 42 of the collector substrate 40. The ceramic particle layer 54 is preferably employed when the thermal stability of the polymer fiber(s) 12 included in the non-woven polymer fiber mat 10 are considered not sufficient for whatever reason. This may be the case when the polymer fiber(s) 12 are comprised of polyethylene or polypropylene, but other reasons may exist for using the ceramic particle layer 54 with other polymer fiber compositions as well. It should be noted, moreover, that other components may be included in the electrode integral segment 44 adjacent to the underlying metallic current collector 48 even though not specifically shown here. An example of such a component is another electrode similar in composition to the electrode 46 situated above the current collector 48.

The electrode 46 may be composed as either a negative electrode or a positive electrode. The compositions associated with each of these electrodes are able to intercalate and de-intercalate lithium ions. They are also formulated to achieve a functional difference—namely, that the two electrodes store intercalated lithium at different electrochemical potentials relative to a common reference electrode (typically lithium). In the construct of an electrochemical battery cell of a lithium ion battery, the negative electrode stores intercalated lithium at a lower electrochemical potential (i.e., a higher energy state) than the positive electrode such that an electrochemical potential difference somewhere between about 2.5 V and about 5 V typically exists between the electrodes, depending on their exact compositions, when the negative electrode is lithiated. These attributes of the negative and positive electrode compositions permit the reversible transfer of lithium ions between the two electrodes either spontaneously (discharge phase) or through the application of an external voltage (charge phase) during operational cycling of the electrochemical battery cell. The thickness of the electrode 46 is preferably between about 30 μm and about 150 μm.

A negative electrode is preferably constructed from a lithium host material such as, for example, graphite, silicon, or lithium titanate. The lithium host material may be intermingled with a polymeric binder material to provide the negative electrode with structural integrity and, optionally, a conductive fine particle diluent. The lithium host material is preferably graphite and the polymeric binder material is preferably one or more of polyvinyldiene fluoride (PVdF), an ethylene propylene diene monomer (EPDM) rubber, styrene butadiene rubber (SBR), a carboxymethoxy cellulose (CMC), polyacrylic acid, or mixtures thereof. Graphite is normally used to make the negative electrode because, on top of being relatively inert, its layered structure exhibits favorable lithium intercalation and deintercalation characteristics which help provide the electrochemical battery cell with a suitable energy density. Commercial forms of graphite that may be used to construct the negative electrode are available from Timcal Graphite and Carbon (headquartered in Bodio, Switzerland), Lonza Group (headquartered in Basel, Switzerland), and Superior Graphite (headquartered in Chicago, Ill.). The conductive diluent may be very fine particles of, for example, high-surface area carbon black.

A positive electrode is preferably constructed from a lithium-based active material that stores intercalated lithium at a higher electrochemical potential than the lithium host material used to make the negative electrode. The same polymeric binder materials (PVdF, EPDM, SBR, CMC, polyacrylic acid) and conductive fine particle diluent (high-surface area carbon black) that may be used to construct the negative electrode may also be intermingled with the lithium-based active material for the same purposes. The lithium-based active material is preferably a layered lithium transition metal oxide, such as lithium cobalt oxide ($LiCoO_2$), a spinel lithium transition metal oxide, such as spinel lithium manganese oxide ($LiMn_2O_4$), a lithium polyanion, such as a nickel-manganese-cobalt oxide [$Li(Ni_xMn_yCO_z)O_2$], lithium iron phosphate ($LiFePO_4$), or lithium fluorophosphate ($Li_2FePO_4F$). Some other suitable lithium-based active materials that may be employed as the lithium-based active material include lithium nickel oxide ($LiNiO_2$), lithium aluminum manganese oxide ($Li_xAl_yMn_{1-y}O_2$), and lithium vanadium oxide ($LiV_2O_5$), to name but a few alternatives. Mixtures that include one or more of these recited lithium-based active materials may also be used to make the positive electrode.

The metallic current collector 48 is preferably a thin and flexible metallic foil which contacts the electrode 46 over an appreciable interfacial surface area. Any metal that is capable of collecting and reversibly passing free electrons to and from the electrode 46 may be employed. The actual metal selected may depend on whether the electrode 46 is composed as a negative electrode or a positive electrode. If the electrode 46 is composed as a negative electrode, for instance, the metallic current collector 48 is preferably a copper foil. If, however, the electrode 46 is composed as a positive electrode, the metallic current collector 48 is preferably an aluminum foil. The thickness of the metallic current collector 48 is preferably between about 5 μm and about 20 μm regardless of whether the electrode 46 is composed as a negative or positive electrode. Other types of metal foils besides those just mentioned may of course be used, if desired.

The ceramic particle layer 54, if present, includes ceramic particles such as, for example, those of alumina, titania, silica, ceria, zirconia, beryllia, magnesia, silicon carbide, boron carbide, hafnium carbide, titanium nitride, silicon nitride, titanium silicide, tungsten silicide, aluminum boride, titanium boride, mullite, spodumene, zirconium silicate, sillimanite, or petalite, to name but a few examples. The ceramic particles have particle diameters that preferably range from about 5 nm to about 2 μm and, most preferably, from about 50 nm to about 700 nm. Application of the ceramic particle layer 54 over the electrode 46 may be accomplished by spraying or coating a ceramic particle dispersion that includes water and/or an organic solvent, for example, as the continuous liquid phase. The presence of the ceramic particle layer 54 within the electrode integral segment 44 provides a very high thermal stability barrier layer immediately adjacent to the electrode 46. Such placement of the ceramic particle layer 54 operates to shield the non-woven polymer fiber mat 10—when assembled into an electrochemical battery cell of a lithium ion battery adjacent to the electrode integral segment 10—from exposure to a debilitating heat influx that could conceivably emanate from the electrode 46 under certain operating conditions. The thickness of the ceramic particle layer 54 is preferably between about 5 μm and about 20 μm.

The electrospinning and electrospraying apparatuses 60, 90 are typically constructed and operated quite similarly despite the fact that they are meant to fabricate different types of physical matter (i.e., fibers vs. particles). For this reason, only the electrospinning apparatus 60 will be described in more detail below with the understanding that, in the preferred embodiment shown in FIG. 2, the electrospraying apparatus 90 includes many of the same components as the electrospinning apparatus 60. The common components of these two apparatuses 60, 90 are therefore identified by like reference numerals with a prime designation being incorporated into the reference numerals of the electrospryaing apparatus 90. The coordinated use of like reference numerals is intended to render the description of any common component below fully applicable to both apparatuses 60, 90, unless otherwise stated to the contrary, even though the component is describe only within the construct of the electrospinning apparatus 60.

The electrospinning apparatus 60 comprises a syringe 62 (sometimes referred to as an extruder) having any suitable construction. The syringe 62 shown here includes a barrel 64 that defines an interior chamber 66 for holding a polymer liquid 68 conducive to electrospinning A tubular nozzle 70 that fluidly communicates with the interior chamber 66 and tapers to a tip 72 protrudes from the barrel 64. The tip 72 defines a terminal orifice 74 of the nozzle 70. A plunger 76 that can move axially within the interior chamber 66 and apply pressure to the polymer liquid 68, thus forcing the polymer liquid 68 through the orifice 74 at a controllable flow rate, is located within the barrel 64. The plunger 76 includes a plunger head 78 radially sealed against the barrel 64 by an appropriate dynamic sealing element. Advancement of the plunger head 78 against the polymer liquid 68 contained in the interior chamber 66 is controlled by a metering device 80. The metering device 80 may be a programmable syringe pump 82, as shown, or it may be some other device that can affect axial motion of the plunger head 78 such as, for example, a system of one or more coordinated valves that can apply pneumatic gas pressure.

The polymer liquid 68 contained in the interior chamber 66 of the barrel 64 and the tubular nozzle 70 is preferably a solution or melt of the polymer material intended to be transformed into the polymer fiber(s) 12. A solution may be employed as the polymer liquid 68 if a solvent that dissolves the selected polymer material is available. If such a solvent is readily available and its use is practical, the solution is prepared with a viscosity that ensures sufficient polymer chain entanglement is experienced between the dissolved polymer material during electrospinning Adequate polymer chain entanglement is believed to be the mechanism which allows the solution to be electrospun into the polymer fiber(s) 12 without disbanding. And the degree of polymer chain entanglement achieved by the dissolved polymer material is generally positively correlated to the viscosity of the solution; that is, an increase in viscosity of the solution corresponds to an increase in polymer chain entanglement of the dissolved polymer material, and vice versa. The viscosity of the solution can be affected most easily by adjusting one or both of the concentration of polymer material in the solution or the average molecular weight of the polymer material. The compositional makeup of the polymer liquid 68, when in solution form, also determines its preferred temperature during electrospinning. Some polymer solutions can be kept at room temperature while others need to be heated to keep the polymer material solvated.

A melt of the polymer material may be employed as the polymer liquid 68 if a solvent for the selected polymer material is not readily available or when a melt is preferred for some other practical reason. The melt is typically prepared with a viscosity that ensures adequate flowability during electrospinning Polymer chain entanglement is usually not an issue here since the melt is composed of essentially all polymer material. Managing the viscosity of the melt, as such, is focused primarily on making sure the melt can be effectively moved through the electrospinning apparatus 60 in the manner needed to electrospin the polymer fiber(s) 12. The viscosity of the melt can be affected most easily by managing one or both of the average molecular weight of the polymer material or the temperature of the melt. The temperature of the melt when present within the electrospinning apparatus 60 is usually greater than room temperature and, in many instances, greater than about 100° C.

Regardless of whether the polymer liquid 68 is employed as a solution or a melt, those skilled in the art will know how to prepare, handle, and properly administer the polymer liquid 68 within the electrospinning apparatus 60 for a wide variety of polymer materials including those mentioned before. Some of those previously-mentioned polymer materials are nonetheless listed below in Table 1 along with at least one compatible solvent that may be used to prepare a solution, if desired, as well as an indication of which polymer materials are preferably employed in melt form.

TABLE 1

Polymer Materials and their Solvent(s) for Electrospraying

| Polymer Material | Solvent(s) and/or Melt |
|---|---|
| Polyimide (i.e., PEI) | NMP; DMF; $CHCl_3$ |
| Flouropolymer (i.e., PVdF) | NMP; DMF; MIK; DMP; AC |
| Polyester (i.e., PET) | TFA; DMC; Melt |
| Polysulfone (i.e., PSf, PES, PPSf, PAS) | NMP; DMF; THF |
| PAN | NMP; DMF; THF |
| Polyacrylate (i.e., PMMA) | NMP; DMF; DMSO; AC |
| Aliphatic PA (i.e., Nylon 6 and 6,6) | Aqueous Acetic Acid or Melt |
| Aromatic PA (i.e., Kevlar) | Sulfuric Acid |
| Polycarbonate (i.e., poly-bisA-carbonate) | NMP; DMF; DMSO |
| Polyurethane | NMP; DMF; DMSO |
| Liquid Crystal Polymer (i.e., Vectran) | Melt |

NMP = N-Methyl-2-Pyrrolidone
THF = Tetrahydrofuran
TFA = Trifluoroacetic Acid
MIK = Methyl Isobutyl Ketone
AC = Acetone
DMF = Dimethyl Formamide
DMSO = Dimethyl Sulfoxide
DMC = Dimethyl Chloride
DMP = Dimethyl Phthalate The electrospraying apparatus 90, as previously mentioned, is constructed similarly to the electrospinning apparatus 60. It comprises a syringe 62' that includes a barrel 64', an interior chamber 66' defined in the barrel 64' for holding a liquid 84 conducive to electrospraying, a tubular nozzle 70' that fluidly communicates with the interior chamber 66' and tapers to a tip 72', a terminal orifice 74' defined in the tip 72', a plunger 76' that can move axially within the interior chamber 66' and which includes a plunger head 78', and a metering device 80' that may be a programmable syringe pump 82' or some other device that can affect axial movement of the plunger head 78'. Each of these features of the syringe 62' functions in the same manner as described above for the electrospinning apparatus 60. One difference here is the liquid 84 employed has a composition that facilitates electrospraying of the particles 16 as opposed to electrospinning of the polymer fiber(s) 12.

The liquid 84 contained in the interior chamber 66' of the barrel 64' and the tubular nozzle 70' is preferably a solution, a sol, or a dispersion of the material (ceramic and/or polymer material, for instance) intended to be transformed into the particles 16. A solution may be employed when the particles 16 are to be made from a polymer material and a solvent that dissolves that particular polymer material is readily available. In this case, and contrary to the electrospinning operation, the solution is prepared with a viscosity that ensures sufficient polymer chain entanglement does not transpire. Minimizing polymer chain entanglement here ensures that the particles 16, and not fibers, are formed. For instance, if the same polymer material is included in both the polymer liquid 68 of the electrospinning apparatus 60 and the liquid 84 of the electrospraying apparatus 90, and both liquids 68, 84 are in solution form, then the viscosity of the liquid 84 is typically lower than the viscosity of the polymer liquid 68 to the extent needed to disperse the liquid 84 in particulate form. The viscosity of the solution can be affected most easily, as before, by adjusting one or both of the concentration of polymer material in the solution or the average molecular weight of the polymer material. The compositional makeup of the liquid 84, when in solution form, also determines its preferred temperature during electrospraying. Any of the polymer materials and their compatible solvents listed in Table 1 may be used to prepare the liquid 84 in solution form, if desired.

The liquid 84 may be a dispersion when the material to be transformed into the particles 16 is a ceramic material or a polymer material for which a solvent that dissolves the polymer material is not available or, if available, is not practical for whatever reason. The dispersion may include a solvent, preferably an organic liquid, as the continuous phase, and particles of the ceramic material and/or polymer material dispersed within the solvent as the solid phase. Several suitable solvents that may be used include N-methyl-2-pyrrolidone, tetrahydrofuran, acetone, and water. The dispersed particles may be composed of any of the previously-mentioned ceramic materials and polymer materials (when used with an appropriate solvent to form a dispersion as opposed to a solution) and are about the same size as the particles 16 that are electrosprayed and incorporated into the non-woven polymer fiber mat 10. Such particle sizes are acceptable because the dispersed particles of the ceramic material and/or polymer material are not expected to experience much change in size when electrosprayed. Any amount of the ceramic and/or polymer material particles may be included in the dispersion so long as enough solvent is present to carry them through, and disperse them from, the electrospraying apparatus 90.

The liquid 84 may be a sol if the particles 16 are intended to be made of a ceramic material and, for whatever reason, an alternative mechanism for providing the ceramic material in particulate form—besides simply dispersing them into a solvent to form a dispersion—is desired. The sol may be prepared by polymerizing an inorganic precursor of the ceramic material in a solvent to form the ceramic material. The particles 16 may then be formed from the sol during electrospraying in much the same way as they are formed from a solution; that is, the sol is prepared with an appropriate viscosity that ensures formation of particles 16—as opposed to fibers—upon dispersal from the electrospinning apparatus 90. One example of a sol that may be employed if, for instance, the particles 16 are sought to be composed of silica, is a hydrolytically polycondensed silane in an acidic aqueous solvent. A sol of this type may be formed by hydrolyzing and polycondensing tetraethyl orthosilicate (often abbreviated TEOS) in aqueous acetic acid. Some other examples of sols that may be employed include those in which the selected ceramic material precursor is aluminum 2,4-pentanedionate (alumina), cerium nitrate (ceria), or titanium tetraisopropoxide (titania).

Figure 3:
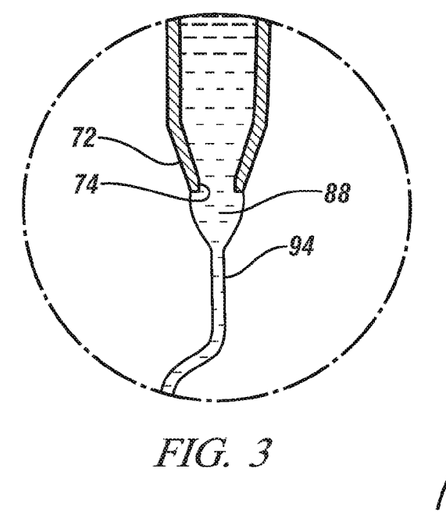
FIG. 3 is a magnified and generalized illustration of a Taylor cone held at the tip of the tubular nozzle of the electrospinning apparatus depicted in FIG. 2.

A high-voltage direct current (DC) energy supply 86 is preferably operatively engaged to both the electrospinning apparatus 60 and the electrospraying apparatus 90 to facilitate the electrospinning and electrospraying operations, respectively. The high-voltage DC energy supply 86 is able to generate an electrical field between the two apparatuses 60, 90 and the collector substrate 40. The electric field may be generated, more specifically, by applying an electrical potential to the tips 72, 72' of the nozzles 70, 70' so that an electrical potential difference of the same polarity sign (+ or −) exists (1) between the tip 72 of the electrospinning apparatus 60 and the collection face 42 of the collector substrate 40 and (2) between the tip 72' of the electrospraying apparatus 90 and the collection face 42 of the collector substrate 40. Either the positive terminal, as shown in FIG. 3, or the negative terminal of the power supply 86 may deliver the applied electrical potential to the tips 72, 72' through an electrode or other appropriate connection. Conversely, the collector substrate 40 may be grounded, which is the preferred arrangement and shown in FIG. 2, or coupled to a terminal of the opposite polarity from the one coupled to the electrospinning and electrospraying apparatuses 60, 90. The opposite polarity terminal, if used, may originate from the same power supply 86 or a different one.

Referring still to FIG. 2, the fabrication of the non-woven polymer fiber mat 10 begins by positioning the collection face 42 of the collector substrate 40 into deposition alignment with both the electrospinning apparatus 60 and the electrospraying apparatus 90. The tips 72, 72' of the nozzles 70, 70' of each apparatus 60, 90 are brought into close proximity—usually within about 5 to about 40 cm—to the collection face 42 during such positioning. The non-woven polymer fiber mat 10 is then formed by simultaneously electrospinning the polymer fiber(s) 12 and electrospraying the particles 16 onto the collection face 42. Simultaneously electrospinning the polymer fiber(s) 12 and electrospraying the particles 16 from the electrospinning apparatus 60 and the electrospraying apparatus 90, respectively, includes generating an electric field between the collector substrate 40 and the two apparatuses 60, 90, pushing the polymer liquid 68 and the liquid 84 through their respective orifices 74, 74', and collecting the polymer fiber(s) 12 and the particles 16 on the collection face 42 of the collector substrate 40.

The electric field is preferably generated by the high-voltage DC power supply 86. This may involve applying an electrical potential—derived from either the positive or negative terminal of the power supply 86—to the tips 72, 72' of the tubular nozzles 70, 70' while, at the same time, grounding the collector substrate 40 or applying an electrical potential from a terminal of the opposite polarity to the one applied to the nozzle tips 72, 72'. The high-voltage DC power supply 86 is usually operated to administer an electrical potential difference between electrospinning and electrospraying apparatuses 60, 90 and the collector substrate 40 that ranges anywhere from about 5 kV to about 50 kV and, more preferably, between about 10 kV and about 35 kV. The generated electric field can be strengthened or weakened by adjusting the electrical potential difference induced by the high-voltage DC power supply 86.

It should be understood that the electric field generated by the high-voltage DC power supply 86 can also be generated and adjustably managed by two similar high-voltage DC power supplies—instead of one as shown in FIG. 2—in which one of the power supplies is operatively engaged the electrospinning apparatus 60 and the other is operatively engaged to the electrospraying apparatus 90. When utilizing two separate high-voltage DC power supplies, however, the electrical potentials separately applied to the electrospinning and electrospraying apparatuses 60, 90 are preferably the same or close enough that a localized electric field is not established between the tips 72, 72' of the nozzles 70, 70' of the two apparatuses 60, 90 that significantly disrupts the movement of the polymer fiber(s) 12 and the particles 16 towards the collection face 42 of the collector substrate 40. Maintaining the lower of the separately applied electrical potentials above about 50% of the higher separately applied electrical potential is usually sufficient to keep the two apparatuses 60, 90 from operating counterproductively.

The polymer liquid 68 contained in the electrospinning apparatus 60 and the liquid 84 contained in the electrospraying apparatus 90 are preferably pushed through their respective orifices 74, 74' by the plunger heads 78, 78', as governed by the metering devices 80, 80', to form pendent droplets of each liquid 68, 84. These droplets are held at the tips 72, 72' of the nozzles 70, 70' by surface tension. An electrostatic force that counteracts surface tension is also induced in these droplets. The electrostatic force is induced by a combination of the mutual charge repulsion promoted by the electric field and the tendency of the charged liquids 68, 84 to gravitate towards the collector substrate 40 through the electric field. The strength of the electric field, moreover, is sufficient to induce an electrostatic force that causes the generally hemispherical surfaces of the pendant droplets to elongate into conical shapes known as Taylor cones 88, 92, as illustratively depicted in FIGS. 3 and 4.

Figure 4:
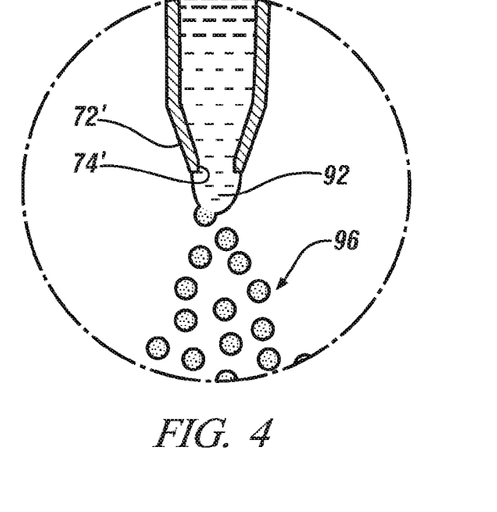
FIG. 4 is a magnified and generalized illustration of a Taylor cone held at the tip of the tubular nozzle of the electrospraying apparatus depicted in FIG. 2.

Eventually the repulsive electrostatic forces induced by the electric field overcomes the surface tension that holds the Taylor cones 88, 92 intact at the tips 72, 72' of the nozzles 70, 70'. This results in expulsion of the liquids 68, 84 from their respective Taylor cones 88, 92. More specifically, and focusing for the moment on the electrospinning apparatus 60, an electrified jet 94 of the polymer liquid 68 is ejected from the Taylor cone 88 towards the collection face 42 of the collector substrate 40. Small bends in the ejected electrified jet 94 repel one another while moving through the electric field and initiate whipping of the jet 94. This whipping phenomenon, in turn, results in lengthening and thinning of the electrified jet 94 and, if present, solvent evaporation. The electrified jet 94—whether originally formed as a solution or a melt—eventually solidifies into the nanometer to micrometer diameter-sized polymer fiber(s) 12, in flight, while traveling towards the collector substrate 40. The same basic activity occurs at the electrospraying apparatus 90 except that an electrified spray 96 of the liquid 84 is ejected from the Taylor cone 92. The electrified spray 96 experiences solvent evaporation (and possibly polymer solidification if the liquid 84 is a solution or a sol) and eventually supplies the particles 16, in flight, while traveling towards the collector substrate 40.

The polymer fiber(s) 12 and the particles 16 are collected on the collection face 42 of the collector substrate 40 and intermingled with one another. Over time this collection of the polymer fiber(s) 12 and the particles 16 builds up and materializes into the non-woven polymer fiber mat 10 of a desired thickness and porosity. Relative side-to-side and/or rotational movement between the nozzles 72, 72' of the two apparatuses 60, 90 and the collection face 42 of the collector substrate 40 may be employed to ensure the non-woven polymer fiber mat 10 is deposited evenly on the collection face 42 or as otherwise intended. Relative movement of this kind can be effectuated by any appropriate mechanism including one or more of a conveyor belt, a rotating drum, a jig, controllable mounts for the electrospinning and/or electrospraying apparatuses 60, 90, and any other type of appropriate mechanism not specifically mentioned here.

Regarding the formation of the non-woven polymer fiber mat 10, skilled artisans will appreciate that various structural aspects of the mat 10 can be dictated by one or more process parameters associated with operation of the electrospinning and electrospraying apparatuses 60, 90. For example, the specific construction of the non-woven polymer fiber mat 10 may be influenced by the compositions of the polymer liquid 68 and the liquid 84 (the materials selected, concentrations, temperatures, forms of the liquids, etc.), the flow rates of the polymer liquid 68 and the liquid 84 through their respective orifices 74, 74' as prescribed by the metering devices 80, 80', the distance between the collection face 42 of the collector substrate 40 and the tips 72, 72' of the nozzles 70, 70' of the two apparatuses 60, 90, the size of the tips 72, 72' of the nozzles 70, 70', and the strength of the electric field induced by the high-voltage DC power supply 86, to name but a few.

Figure 6:
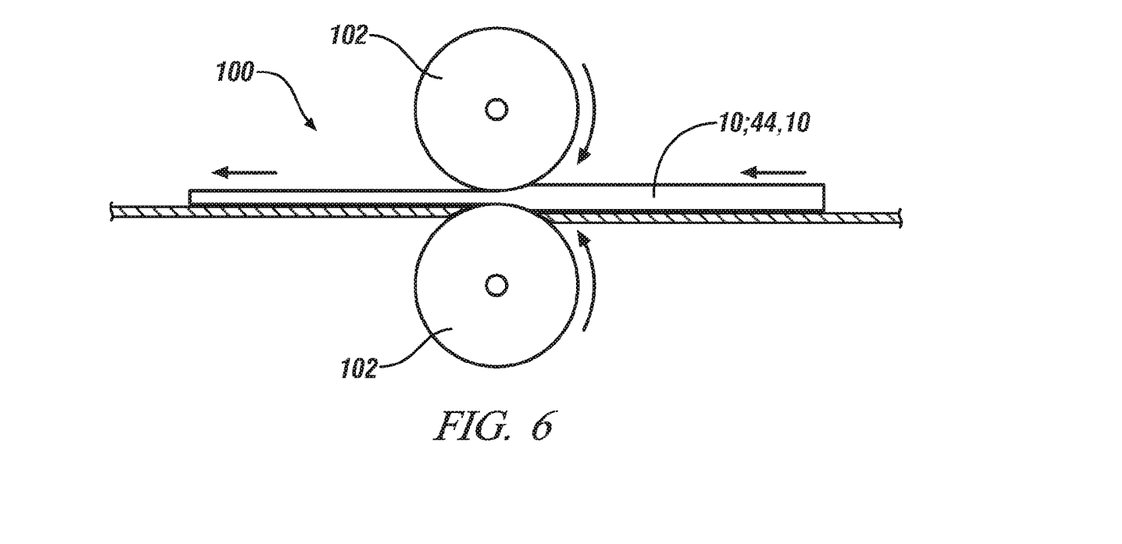
FIG. 6 is a generalized and schematic illustration of a calendaring apparatus that may be used to calendar the non-woven polymer fiber mat after the mat is formed by the electrospinning apparatus and the electrospraying apparatus depicted in FIG. 2.

After the non-woven polymer fiber mat 10 is formed, the collection face 42 of the collector substrate 40 is taken out of deposition alignment with the electrospinning and electrospraying apparatuses 60, 90. The non-woven polymer fiber mat 10 may be removed from the collector substrate 40 by peeling or some other appropriate technique if the mat 10 is intended to be fabricated as "free-standing." Additional steps may now be performed on the non-woven polymer fiber mat 10 if desired. For example, as shown in FIG. 6, the non-woven polymer fiber mat 10 may be calendared in a calendaring apparatus 100 to improve the mechanical performance and dimensional uniformity of the mat 10. The calendaring apparatus 100 includes at least a pair of counter-rotating rollers 102 between which the non-woven polymer fiber mat 10 can be passed. The rollers 102 are preferably heated and, together, they exert a pressure that compresses the mat 10 as it passes between them. Other acts in addition to, or in lieu of, the calendaring act just described may also be practiced even though such acts are not specifically discussed here. The non-woven polymer fiber mat 10 may also be retained on the collector substrate 40 and the entire structure calendared if the substrate 40 is constructed as the electrode integral segment 44 illustrated, for instance, in FIG. 5.

Figure 7:
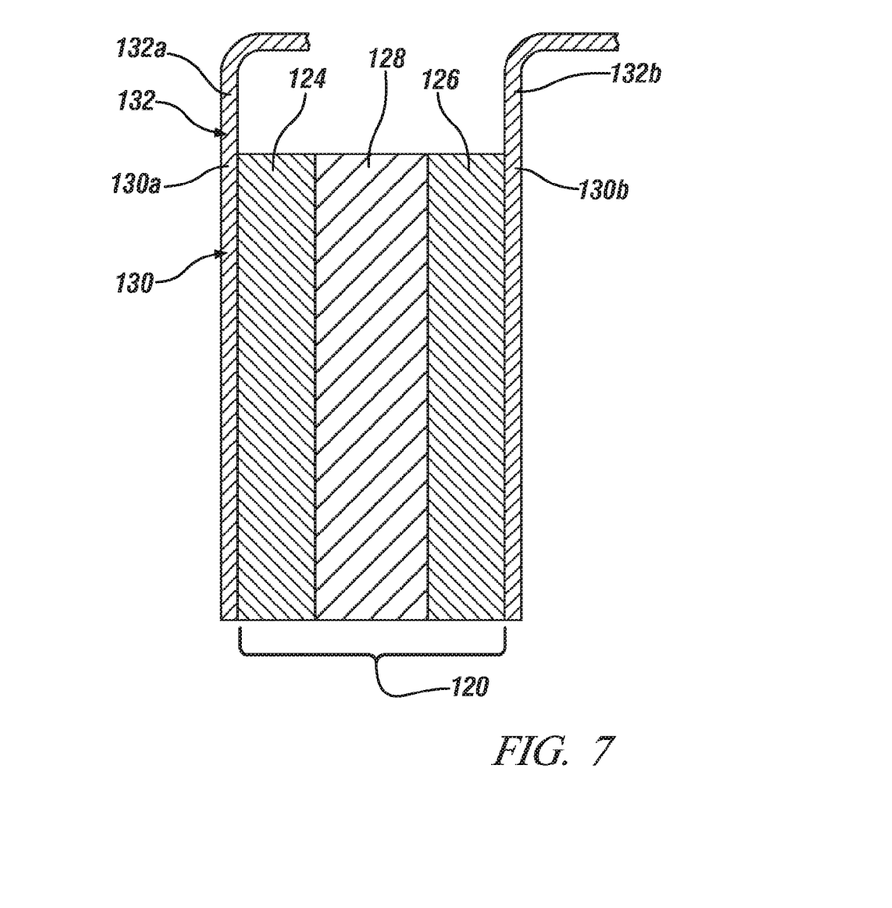
FIG. 7 is a generalized and schematic cross-sectional illustration of an electrochemical battery cell formed with the non-woven polymer fiber mat depicted in FIG. 1.

The non-woven polymer mat 10 may be incorporated into an electrochemical battery cell 120 of a lithium ion battery as shown, for example, in FIG. 7. The electrochemical battery cell 120 comprises a negative electrode 124 and a positive electrode 126 separated by a separator 128. To help efficiently pass an electric current between the two electrodes 124, 126, a metallic current collector 130 may be situated on each side of the electrochemical battery cell 120. More specifically, a negative-side metallic current collector 130a supports the negative electrode 124 and a positive-side metallic current collector 130b supports the positive electrode 126. The metallic current collectors 130a, 130b may include tabs 132a, 132b for accommodating an electrical connection. Each of the metallic current collectors 130a, 130b preferably engages their respective electrodes 124, 126 over an appreciable interfacial surface area to facilitate the efficient collection and distribution of free electrons. The preferred constructions of the negative and positive electrodes 124, 126 and the metallic current collectors 130a, 130b are the same as described earlier with respect to the electrode integral segment 44 shown in FIG. 5 and, as such, need not be repeated here.

The separator 128 is a thin and electrically insulative mechanical barrier layer that physically separates the confronting electrodes 124, 126 to prevent a short-circuit in the electrochemical battery cell 120. The non-woven polymer fiber mat 10 may constitute the entire separator 128 or, alternatively, it may constitute part of the separator 128 if, for example, the separator 128 is a multi-layer composite. Using the non-woven polymer fiber mat 10 as all or part of the separator 128 may be helpful for at least several reasons. First, the non-woven polymer fiber mat 10 has a porosity sufficient to accommodate a liquid electrolyte suitable to communicate lithium ions. Second, the non-woven polymer fiber mat 10—or the combination of the non-woven polymer fiber mat 10 with the ceramic particle layer 54 and/or some other layer—is thermally stable enough that a temperature spike above 80° C. in the electrochemical battery cell 120 can be endured by the separator 128 without a significant sacrifice in functionality. And finally, dimensional shrinkage of the non-woven polymer fiber mat 10 can be avoided because significant stretching is not required to fabricate the mat 10 with its porosity characteristics.

The non-woven polymer fiber mat 10 may be incorporated into the electrochemical battery cell 120 in several different ways depending on whether the mat 10 is "free-standing" or retained on the electrode integral segment 44. If free-standing, the non-woven polymer fiber mat 10 may be situated and pressed between the negative and positive electrodes 124, 126 in any suitable manner. If retained on the electrode integral segment 44, the electrochemical battery cell 120 may be formed by pressing the electrode integral segment 44 and the retained non-woven polymer fiber mat 10 against another electrode composed to function as the opposite of the electrode 46 included in the electrode integral segment 44, with the non-woven polymer fiber mat 10 being situated between the two electrodes. That is, if the electrode 46 included in the electrode integral segment 44 is composed as a negative electrode, then the other electrode combined with the electrode integral segment 44 and the retained non-woven polymer fiber mat 10 is composed as a positive electrode, and vice-versa.

The separator 128, and thus the non-woven polymer fiber mat 10, is soaked with a liquid electrolyte when present in the electrochemical battery cell 120. The liquid electrolyte is able to communicate lithium ions, and is preferably a lithium salt dissolved in a non-aqueous solvent. Some suitable lithium salts that may be used to make the liquid electrolyte include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The non-aqueous solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents.

Figure 8:
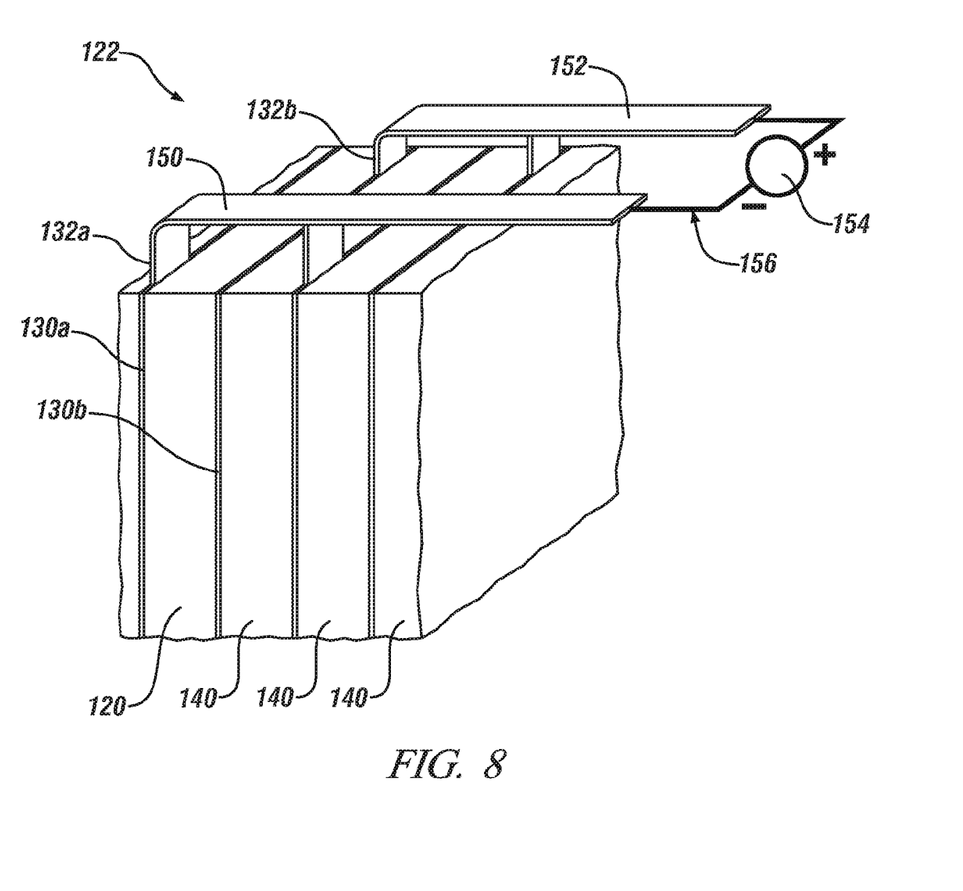
FIG. 8 is a generalized and schematic illustration of a lithium ion battery that includes the electrochemical battery cell depicted in FIG. 7.

The electrochemical battery cell 120 may be stacked up with and connected to a plurality of other electrochemical battery cells, each identified generally as numeral 140, to assemble a lithium ion battery 122, as shown in FIG. 8 (although winding and overlapping one continuous cell 120 around a core to form a cylindrical lithium ion battery may also practiced). The generally-identified electrochemical battery cells 140 may be structurally the same, and formed in the same manner, as the electrochemical battery cell 120 just described, or they may be different. Anywhere from five to fifty of the electrochemical battery cells 120, 140 are typically connected in series—although a parallel connection is also permitted—to form the lithium ion battery 122. Several of the lithium ion batteries 122 may then be connected in series or in parallel to assemble a lithium ion battery pack (not shown) with the voltage and current capacity demanded for a particular application. For instance, anywhere from twenty to two hundred and fifty of the lithium ion batteries 122 are often included in a lithium ion battery pack if the battery pack is intended to be used—either alone or in combination with other lithium ion battery packs—as an on-board power source in a hybrid-electric vehicle (HEV), an extended range electric vehicle (EREV), or some other similar vehicle. While the electrochemical battery cells 120, 140 incorporated into the lithium ion battery 122 shown in FIG. 8 are rectangularly-shaped and stacked side-by-side in a modular configuration, it should be understood that the lithium ion battery 122 shown here is only a schematic illustration. FIGS. 7 and 8 are not intended to inform the relative sizes of the electrochemical battery cells' components or to limit the wide variety of structural configurations the lithium ion battery 122 may assume.

A negative terminal 150 and a positive terminal 152 of the lithium ion battery 122 may be connected to an electrical device 154 as part of an interruptible circuit 156 established between the negative electrodes and the positive electrodes of the several electrochemical battery cells 120, 140. The electrical device 154 may be a wide variety of electrical loads and power-generating devices. An electrical load is a power-consuming device that is powered fully or partially by the lithium ion battery 122. Conversely, a power-generating device is one that charges or re-powers the lithium ion battery 122 through an applied external voltage. The electrical load and the power-generating device can be the same device in some instances. For example, the electrical device 154 may be an electric motor for a HEV or an EREV that is designed to draw an electric current from the lithium ion battery 122 during acceleration and provide a regenerative electric current to the lithium ion battery 122 during deceleration. The electrical load and the power-generating device can also be different devices. For example, the electrical load may be an electric motor for a HEV or an EREV and the power-generating device may be an AC wall outlet, an internal combustion engine, and/or a vehicle alternator.

The lithium ion battery 122 can provide a useful electrical current to the electrical device 154. An electrical current can be produced by way of reversible electrochemical reactions that occur in the electrochemical battery cells 120, 140 when the interruptible circuit 156 is closed to connect the negative terminal 150 and the positive terminal 152 at a time when the negative electrodes contain intercalated lithium (i.e., battery discharge). The electrochemical potential difference between the negative electrode and the positive electrode in each cell 120, 140—approximately 2.5 to 5V—drives the oxidation of intercalated lithium contained in the negative electrodes. Free electrons produced by this oxidation reaction are collected by the negative-side current collectors 130a and are supplied to the negative terminal 150. A flow of free electrons is harnessed and directed through the electrical device 154 from the negative terminal 150 to the positive terminal 152 and eventually to the positive electrodes by way of the positive-side current collectors 130b. Lithium ions, which are also produced at the negative electrodes, are concurrently carried through the separators by the liquid electrolyte in route to the positive electrodes as well. The flow of free electrons through the electrical device 154 from the negative terminal 152 to the positive terminal 154 can be continuously or intermittently provided until the negative electrodes are depleted of intercalated lithium or the capacity of the electrochemical battery cells 120, 140 is otherwise spent.

The lithium ion battery 122 can be charged or re-powered at any time by applying an external voltage to the electrochemical battery cells 120, 140. Application of the external voltages drives the reverse the electrochemical reactions that occur during discharge. The applied external voltage compels the otherwise non-spontaneous oxidation of intercalated lithium contained in the positive electrodes to produce free electrons and lithium ions. The free electrons are collected by the positive-side current collectors 130b and are supplied to the positive terminal 152. A flow of the free electrons is directed to the negative terminal 150, and eventually to the negative electrodes, by way of the negative-side current collectors 130a. The lithium ions are concurrently carried back through the separators by the liquid electrolyte towards the negative electrodes as well. The lithium ions and the free electrons eventually reunite and replenish the negative electrodes with intercalated lithium to prepare the electrochemical battery cells 120, 140 for another discharge phase. The external voltage may originate from the electrical device 154 as previously mentioned or by some other suitable mechanism.

The above description of preferred exemplary embodiments is merely descriptive in nature; it is not intended to limit the scope of the claims that follow. Each of the terms used in the appended claims should be given its ordinary and customary meaning unless specifically and unambiguously stated otherwise in the specification.

The invention claimed is:

1. A method comprising:
   (a) providing a collector substrate that includes a collection face;
   (b) positioning the collection face of the collector substrate into deposition alignment with both an electrospinning apparatus and an electrospraying apparatus; and
   (c) forming a non-woven polymer fiber mat onto the collection face of the collector substrate, the non-woven polymer fiber mat comprising a fibrous web of one or more polymer fibers and particles dispersed throughout the fibrous web, the non-woven polymer fiber mat being formed by at least the steps of:
      (c1) electrospinning the fibrous web of one or more polymer fibers onto the collection face; and, simultaneously;
      (c2) electrospraying the particles towards the same portion of the collection face of the collector substrate so that the particles become intermingled with the polymer fiber(s) as the particles and the polymer fiber(s) travel towards the collection face of the collector substrate;
   (d) removing the non-woven polmer fiber mat from the collection face of the collector substrate; and
   (e) calculating the non-woven polymer fiber mat by passing the non-woven polymer fiber mat between a pair of counter-rotating rollers to compress the mat.

2. The method set forth claim 1, wherein the polymer fiber(s) are comprised of a polyolefin, a polyamic acid, a polyimide, a polyamide, a polysulfone, a polyester, a fluoropolymer, a polyacrylate, a polycarbonate, a polyurethane, or mixtures thereof.

3. The method set forth in claim 1, wherein the polymer fiber(s) are comprised of polypropylene, polyethylene, polyetherimide, polyhexamethylene adipamide, polycaprolactam, polyparaphenylene terephthalamide, standard polysulfone, polyarylsulfone, polyethersulfone, polyphenylsulfone, polyethylene terephthalate, polyvinylidene fluoride, poly(methyl methacrylate), polyacrylonitrile, poly(bisphenol A-carbonate), or mixtures thereof.

4. The method set forth in claim 1, wherein the polymer fiber(s) are comprised of polyethylene terephthalate, polyvinylidene fluoride, polyacrylonitrile, polyetherimide, an aromatic polyamide, a liquid crystal polymer, or mixtures thereof.

5. The method set forth in claim 1, wherein the particles are comprised of a ceramic material, a polymer material, or a mixture thereof.

6. The method set forth in claim 1, wherein the non-woven polymer fiber mat has a thickness that ranges from about 5 µm to about 50 µm.

7. The method set forth in claim 1, wherein the polymer fiber(s) have a diameter in the range of about 10 nm to about 10 µm and the particles have diameters in the range of about 50 nm to about 5 µm.

8. The method set forth in 1 further comprising:
   incorporating the non-woven polymer fiber mat into an electrochemical battery cell of a lithium ion battery.

9. The method set forth in claim 1, wherein the collector substrate comprises an electrode composed as either a negative electrode or a positive electrode for a lithium ion battery cell, and further comprising:
pressing the collector substrate and the non-woven polymer fiber mat retained on the substrate together with another electrode complimentary to the electrode included in the collector substrate, and wherein the non-woven polymer fiber mat is situated between the electrodes.

10. A method comprising:
    (a) providing a collector substrate that includes a collection face;
    (b) electrospinning a fibrous web of one or more polymer fibers onto the collection face of the collector substrate; and
    (c) spraying particles towards the collection face of the collector substrate, the spraying of particles being a separate operation than the electrospinning of the one or more polymer fibers and being performed such that the sprayed particles become intermingled with the one or more polymer fibers as the particles and the one or more polymer fibers travel towards the same portion of the collection face of the collector substrate;
    wherein step (b) and step (c) are performed simultaneously to fabricate the non-woven polymer fiber mat includes the fibrous web of the polymer fiber(s) and the particles dispersed throughout the fibrous web, the non-woven polymer fiber mat having a first major face and a second major face that together define a thickness of the mat, the first and second major faces being oriented so than one of the first or second major faces confronts the negative electrode and the other of the first or second major faces confronts the positive electrode when the non-woven polymer fiber mat is situated between spaced apart and confronting surfaces of the negative electrode and the positive electrode within the electrochemical battery cell of a lithium ion battery, the non-woven polymer fiber mat further having a thickness that ranges anywhere from about 5 µm to about 50 µm and a porosity that ranges anywhere from about 30% to about 90%.

11. The method set forth in claim 10, wherein step (b) comprises deriving the polymer fiber(s) from an electrified jet of a polymer liquid conducive to electrospinning, and wherein step (c) comprises deriving the particles from an electrified spray of a liquid conducive to electrospraying.

12. The method set forth in claim 11, wherein the polymer liquid conducive to electrospinning comprises a polyolefin, a polyamic acid, a polyimide, a polyamide, a polysulfone, a polyester, a fluoropolymer, a polyacrylate, a polycarbonate, a polyurethane, or mixtures thereof, and wherein the liquid conducive to electrospraying comprises a ceramic material, a polymer material, or mixtures thereof.

13. The method set forth in claim 10, wherein the collector substrate comprises a metal layer.

14. The method set forth in claim 10, wherein the collector substrate comprises an electrode composed as either a positive electrode or a negative electrode for an electrochemical battery cell of a lithium ion battery, and wherein either the electrode or a ceramic particle layer overlying the electrode is exposed at the collection face.

15. The method set forth in claim 10, wherein the polymer fiber(s) have a diameter in the range of about 10 nm to about 10 µm and the particles have diameters in the range of about 50 nm to about 5 µm.

16. The method set forth in claim 10, further comprising:
    (d) incorporating the non-woven polymer fiber mat into an electrochemical battery cell of a lithium ion battery such that that the non-woven polymer fiber mat functions as all or part of a separator that physically separates and electrically insulates a negative electrode and the positive electrode.

17. A method comprising:
(a) positioning a collection face of a collector substrate in deposition alignment with both an electrospinning apparatus and an electrospraying apparatus;
(b) generating an electric field between the collector substrate and each of the electrospinning apparatus and the electrospraying apparatus, the electric field being such that an electrical potential difference of the same polarity exists (1) between the electrospinning apparatus and the collector substrate and (2) between the electrospraying apparatus and the collector substrate;
(c) pushing a polymer liquid conducive to electrospinning through an orifice of the electrospinning apparatus so that an electrically charged jet of the polymer liquid is ejected towards the collection face of the collector substrate, the electrically charged jet of the polymer liquid solidifying into one or more polymer fibers when traveling towards the collection face of the collector substrate;
(d) pushing a liquid conducive to electrospraying through an orifice of the electrospraying apparatus so that an electrically charged spray of the liquid is ejected towards the collection face of the collector substrate at the same time that the electrically charged jet of the polymer liquid is being ejected from the electrospinning apparatus, the electrically charged spray providing particles that intermingle with the one or more polymer fibers produced by the electrospinning apparatus as the particles and the one or more polymer fibers travel towards the same portion of the collection face of the collector substrate; and
(e) collecting a non-woven polymer fiber mat on the collection face of the collector substrate, the non-woven polymer fiber mat comprising (1) a fibrous web of the one or more polymer fibers derived from the electrified jet of the polymer liquid conducive to electrospinning and (2) particles derived from the electrified spray of the liquid conducive to electrospraying which are dispersed throughout the fibrous web of the polymer fiber(s), the polymer fiber(s) having a diameter in the range of about 10 nm to about 10 μm and the particles having diameters in the range of about 50 nm to about 5 μm.

18. The method set forth in claim 17, wherein step (b) comprises applying an electrical potential to the electrospinning apparatus and the electrospraying apparatus so that the electrical potential difference between each of (1) the electrospinning apparatus and the collector substrate and (2) the electrospraying apparatus and the collector substrate ranges from about 5 kV to about 50 kV.

19. The method set forth in claim 17, wherein the non-woven polymer fiber mat comprises about 20 vol. % to about 80 vol. % of the polymer fiber(s) and about 20 vol. % to about 80 vol. % of the particles, each based on the total volume of the polymer fiber(s) and the particles.

20. The method set forth in claim 17, further comprising:
(f) calendering the non-woven polymer fiber mat; and
(g) incorporating the non-woven polymer fiber mat into an electrochemical battery cell of a lithium ion battery such that that the non-woven polymer fiber mat functions as all or part of a separator that physically separates and electrically insulates a negative electrode and a positive electrode.

* * * * *